United States Patent

[11] 3,612,897

| [72] | Inventor | Karl-Werner Kanngiesser<br>Viernheim, Germany |
|---|---|---|
| [21] | Appl. No. | 881,162 |
| [22] | Filed | Dec. 1, 1969 |
| [45] | Patented | Oct. 12, 1971 |
| [73] | Assignee | Aktiengesellschaft Brown, Boveri & Cie<br>Baden, Switzerland |
| [32] | Priority | Dec. 11, 1968 |
| [33] | | Germany |
| [31] | | P 18 13 853.9 |

[54] ARRANGEMENT FOR TAPPING THE DC LINK OF A HIGH-VOLTAGE DIRECT CURRENT TRANSMISSION SYSTEM
11 Claims, 3 Drawing Figs.

[52] U.S. Cl. .................................................... 307/87,
321/5, 321/27
[51] Int. Cl. ........................................................ H02j 1/00
[50] Field of Search............................................ 307/87;
321/5, 26, 27, 2

[56] References Cited
UNITED STATES PATENTS

| 3,431,482 | 3/1969 | Uhlmann...................... | 321/27 X |
| 3,466,525 | 9/1969 | Ainsworth.................... | 321/5 |
| 3,470,442 | 9/1969 | Ainsworth.................... | 321/27 X |
| 3,500,057 | 3/1970 | Stackegard................... | 321/2 X |

Primary Examiner—Lee T. Hix
Assistant Examiner—A. D. Pellinen
Attorney—Pierce, Scheffler & Parker ABSTRACT: An arrangement for tapping the DC link of a high-voltage direct-current transmission system which comprises at least two series-connected auxiliary converters and power transformer means, wherein each auxiliary converter is controlled by a grid control unit. The grid control units are either controlled by the outputs of an AC-voltage controller and a DC-voltage controller or by the output of the DC-voltage controller only. The output of the AC-voltage controller is simultaneously applied to the input terminals of the grid control units and the output of the DC-voltage controller is successively applied to the input terminals of the grid control units by means of a controlled connector switch.

ARRANGEMENT FOR TAPPING THE DC LINK OF A HIGH-VOLTAGE DIRECT CURRENT TRANSMISSION SYSTEM

The present invention relates to an arrangement for tapping the connecting line of a high-voltage direct-current transmissions (HV DC transmission) by means of a tapping station consisting of variable current rectifiers and series-connected power transformers.

In their present form, high-voltage DC transmissions consist of two converter stations, of which one is operated as a rectifier and the other as an inverter, and of a DC connecting line. There exists the requirement of tapping such a two-point connection for extracting or feeding in power. The methods proposed to this end (U. Lamm, E. Uhlmann, P. Donfors: "Some aspects of Tapping of H.V. DC Transmission Sustems" "Direct current," vol 8, No. 5, May 1963 and K. W. Huddard, W. G. Watson: "Multiterminal DC Transmission," IEE Conference of High-Voltage DC transmission, Publication No. 22, No. 17 Sept. 1966) for such a tapping provide either for an intermediate station constructed for the full DC voltage and connected between the terminals of the DC line—referred to in the following as a parallel circuit—or else an intermediate station, constructed for the full DC voltage and looped into the run of the line—this arrangement will hereinafter be referred to as series circuit. Both these solutions have advantages and drawbacks. The parallel circuit has the advantage that the power transmitted between the main stations of the HV DC transmission and the power extracted and supplied in the intermediate station can be adjusted independently, and that the voltage in the DC line remains substantially constant independently of the tapped power. However, the construction of the current converter valves and of the transformer windings on the side of the valves, are difficult and expensive, especially where the tapped power amounts to only a small fraction of the transmitted power, because in this case a comparatively very small nominal current corresponds to a very high nominal voltage, related to the power. The parallel circuit represents the transition to the so-called HV DC transmission multipoint system with its specific complicated control problems. In addition, there is a requirement of HV DC switches which are not yet available.

On the other hand, in the series circuit, the independence in the adjustment of transmitted and tapped power exists only to a limited extent insofar, as the nominal output of the intermediate station can only be reached if the DC line carries nominal or rated current. In many applications, however, this limitation can be accepted without disadvantage. The special advantage of the series circuit resides in the favorable construction of the current converter valves and of the transformer windings on the valve side, where nominal current and nominal voltage are favorably related to each other. The task, existing also here, of insulating the full DC voltage against earth can be solved comparatively easily. The operation of a HV DC transmission with tap in series circuit may be carried out by means of a simple control method in two-point arrangement and no DC switches are required.

A substantial drawback of the series circuit is in the adjustment of the tapped power within wide limits. Since the direct current is given by the transmission, this can be effected only by modifying the DC voltage of the intermediate station. An adjustment of the voltage by adjusting transformers or by current converter transformers or by current converter transformers equipped with stepping switches, is rather limited and, in addition thereto, this construction is expensive. The obvious idea of using the grid control of the current converter valves for this purpose, presents problems of the reactive power behavior because the cos Φ drops substantially in proportion to the voltage reducing control of a converter and reaches zero value at zero voltage, whilst the apparent power is substantially constant over the whole range. The loading of the three-phase network with a reactive power resulting from this attitude of the converter and which is, additionally, strongly variable as a function of the station power, would be regarded as tolerable only in a few cases. Particularly in the case of HV DC transmission with tapping, it will have to be assumed that a comparatively weak three-phase current network is to be improved by the tapped power, wherein this network should not be interfered in its reactive power balance by the tapping, but should be supported thereby.

It is the object of the present invention to eliminate the disadvantage, just described, in an arrangement for tapping a HV DC transmission in series circuit and to meet, in addition thereto, the special requirements in connecting the intermediate station with a comparatively weak three-phase network, that is to say, to achieve more particularly a low and constant reactive power requirement and a simple control method, thus eliminating the transition to a complex and expensive HV DC transmission multiple-point system.

According to the invention, this object is realized in that there are provided at least two converter bridges, connected in series on the DC side and adapted to be independently controlled so that they follow the same adjusting order successively and/or different adjusting orders simultaneously.

Accordingly, two control methods are used in the arrangement according to the invention. The one method, called sequential control, is characterized in a preferred embodiment of the invention in that there is provided, for producing the adjusting order for the sequential control of the converter bridges, a power or frequency regulator with series connected DC voltage regulator on the three-phase side, wherein its output signal is applied to a switching system which passes the adjusting order as a function of the nominal DC voltage only to one of the grid control sets of the converter bridges for modulating the whole available control angle range, i.e. from full rectifier control via zero control to the maximum permissible inverter control. If yet a further modification of the tapping voltage is required, a second converter bridge is modulated and so forth.

According to the other method, which represents a convenient and preferred further development of the invention, the above described main control is effected always by means of a simultaneous change of the control angle of a converter bridge, whilst, by means of a reactive power or voltage regulator on the three-phase current side all other converter bridges are simultaneously controlled together and minutely so that the reactive power requirement changes in the desired sense.

A preferred construction of the tapping station according to the invention, particularly if the same is constructed from four converter bridges, provides for a single converter transformer with four mutually slightly insulated secondary windings and the three-phase current lead-ins associated with one phase pass through a common HV grommet insulator to the windings, wherein each such HV insulator has a number of intermediate voltage passages corresponding to the number of bridges.

In a further preferred embodiment of the invention, a HV DC transmission with current reversal and pole reversing switches comprises a device for switching the tapping station to the other line terminal and for switching to the other current direction, and constructed preferably from isolating switching.

The construction, operation and functioning of the arrangement for tapping a HV DC transmission according to the invention will now be described with reference to the accompanying drawings, in which.

Figure 1:
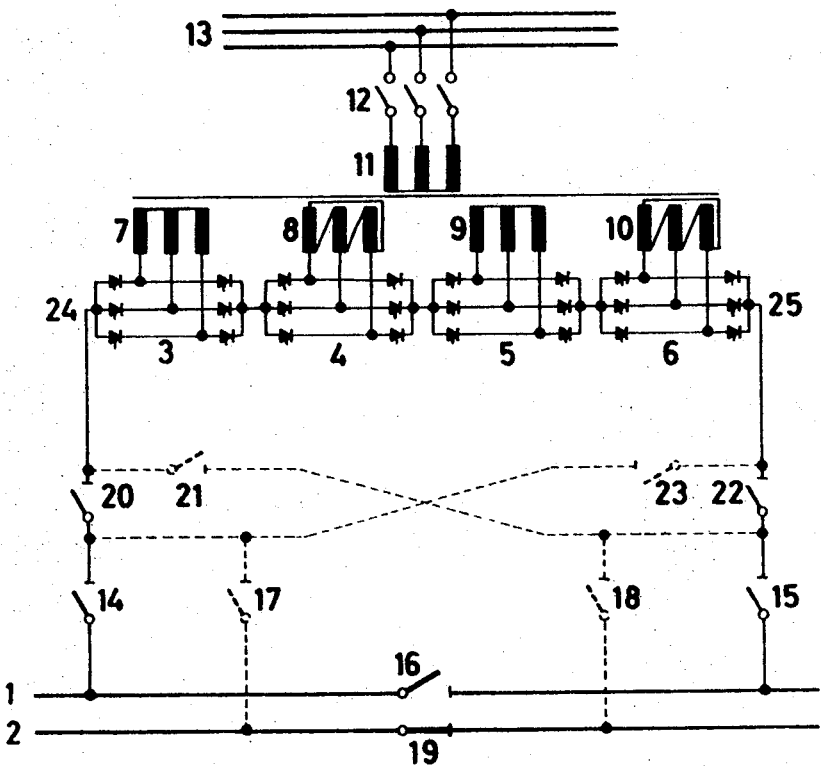
FIG. 1 shows a tapping station constructed from four converters bridges and comprising isolating switches for switching the direction of the current and of the terminal.

FIG. 1 shows at 1 and 2 the two terminals of the HV DC line. The tapping station is switched into the run of the terminal pole 1; the station consists of four variable converter bridges 3, 4, 5 and 6, connected in series on the DC side and carrying the total current of the HV DC transmission flowing through the pole 1. The current converter bridges 3 to 6 are supplied in the AC side each by a secondary winding 7, 8, 9 and 10 of a common current converter transformer. The primary winding 11 is connected by a power switch 12 to a three-phase current network 13 into which energy is to be supplied, or from which it is to be taken. The windings 7 to 10 of the converter transformer are circuited alternatively in star and delta to achieve a 12 pulse reaction to the three-phase current network 13.

The isolating switches 14 to 16, shown in FIG. 1, serve to switch the tapping station into the line terminal 1. The dotted line connections and the isolating switches 17 to 23 are necessary where the tapping station is also to be switched into the line terminal 2, or where the direction of the current in the line terminals changes. For switching the tapping station into the line terminal 1, with the current flowing from left to right in FIG. 1; the switches 14, 15, 20, 22 and 19 are closed, the other switches are open. In detail, the switch arrangement is as follows: The two isolating switches 16 and 19 are positioned in the lines of terminals 1 and 2 and isolate them. At both ends 24 and 25 of the tapping station, two switches are connected which make possible the pole reversal of the station. The connection in the terminals 1 and 2 is formed by the isolating switches 14 and 15, and 17 and 18, respectively. If, for example, the current flow in the line terminal 1 were in the other direction, the switches 14, 15, 21, 24 and 19 would be closed and all others open. The other switches serve for the two current directions in the line terminal 2, when the station is switched into the same. These possibilities of switching with different directions of current flows are particularly advantageous, for example, if a change in the direction of energy is to be carried out by pole reversing switches in a HV DC transmission cable link. The switching of the tapping station at choice into one or the other terminal of the HV DC transmission link makes it possible to maintain the station in operation even if the other pole must be switched off for reasons of breakdown or for other reasons.

The adjustment of the power which may be exchanged through the tapping station is effected by means of the voltage adjusted in the converter bridges by means of the grid control, because the direct current in the HV DC transmission and thus also in the bridges is fixed. The magnitude and the polarity of the voltage are determined by the control device, in that the converter bridges are modulated in the inverter range when energy is extracted, and in the rectifier range when it is fed in. The total voltage of the tapping station results from the addition of the individual voltages in the converter bridges. If, for example, in the construction of FIG. 1, the bridges 3 and 4 are modulated at maximum as inverters and the bridges 5 and 6 as rectifiers, the total voltage is zero; if the inverter bridges remain at maximum modulation and the rectifier bridges are reversed into the inverter range, the addition of the four individual voltages gives the maximum inverter voltage, i.e,. the maximum inverse voltage at the tapping station. This represents the case of the maximum power which can be taken from the HV DC transmission. If the inverter groups are modulated at maximum into the rectifying range, the maximum power to be fed into the HV DC installation is achieved. By correspondingly adjusting the control angle, all intermediate positions may be produced between maximum extracted power, no power exchange, and maximum feed-in. In addition to adjusting the total voltage at the tapping station, according to the invention the bridges are also so controlled that the reactive power requirement is as low and constant as possible. In order to keep the reactive power as low as possible, only one of the four converter bridges shown in the embodiment is controlled, and its control angle changed according to the requirements, whilst the control angles of the remaining three bridges are kept constant. If this one bridge reaches, during the adjustment of the voltage, the limits of the control range $\alpha=0°$ or $\gamma=\gamma min$, then the corresponding control angle is kept constant and the voltage is changed further by means of the control angle of the converter bridge which now takes over. This type of control can be called sequential control.

Figure 2:
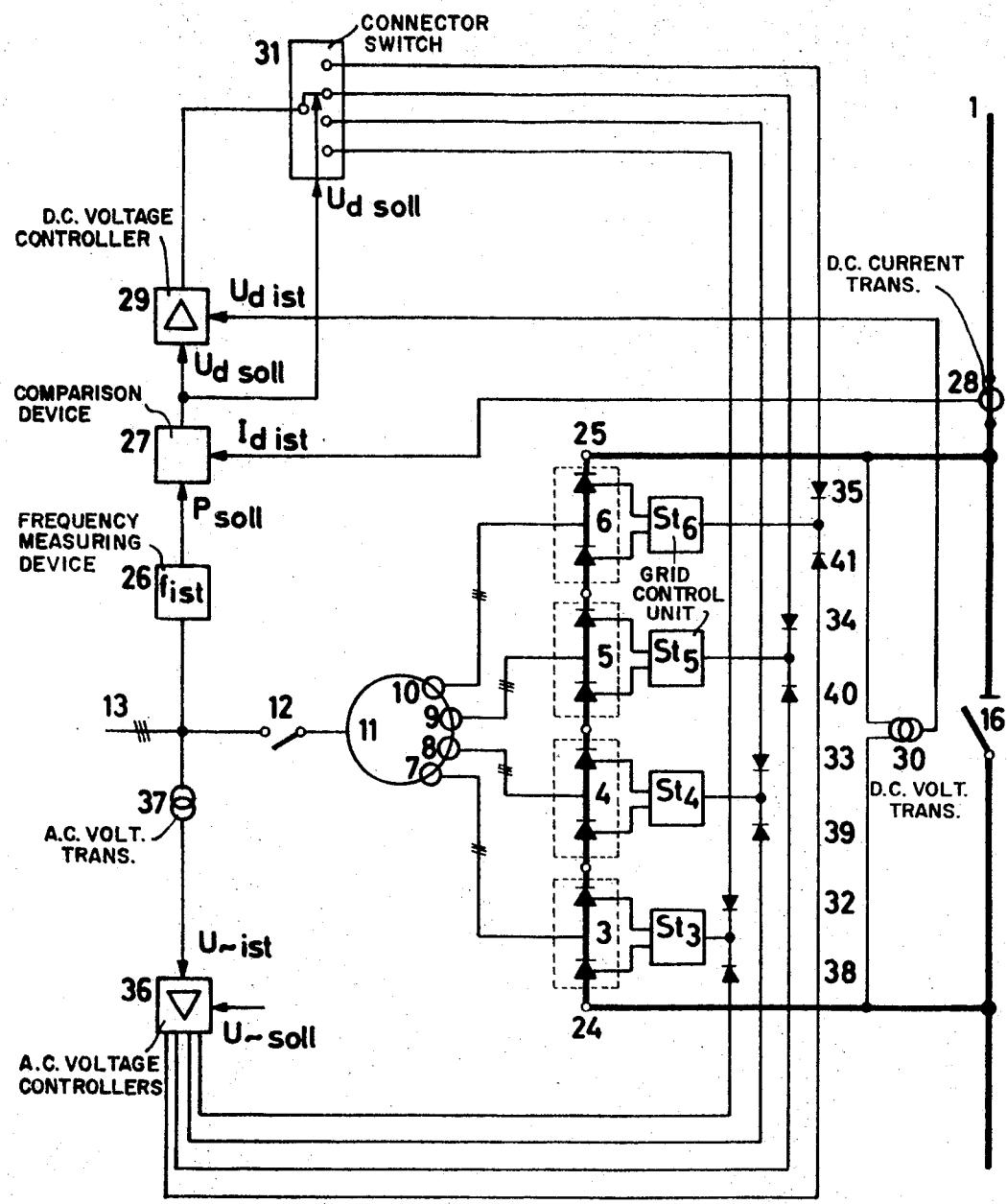
FIG. 2 shows diagrammatically a tappings station constructed from four converter bridges with the associated controls and regulating devices.

FIG. 2 shows diagrammatically a tapping station constructed from four converter bridges and the associated controls and regulating devices, necessary for producing and correctly using the adjusting orders necessary for sequential control. The four converter bridges 3, 4, 5 and 6 are connected to the AC network 13 through the transformer windings 7, 8, 9 and 10, the primary winding 11 of the converter transformer and the power switch 12. The grids of the individual valves of the corresponding converter bridges receive their control pulses from four grid control units $St3$, $St4$, $St5$ and $St6$. The grid control units are of a conventional type equivalent to the control pulse generator 34 shown in FIG. 3 of U.S. Pat. No. 3,431,482. The frequency of the AC network 13 is detected by a frequency measuring device 26 and the nominal power $P_{soll}$ occurs at the output of 26 in accordance with a certain characteristic. The structure for the frequency measuring device 26 can be suitably chosen in accordance with the design shown in FIG. 15.4 on page 8 of the book "Theoretische Elektrotechnik" by Kupfmuller, 7th Ed. 1962 published by Springer-Verlag Berlin, Gottingen, Heidelberg, West Germany. This value $P_{soll}$ is applied to a comparison device 27 which is a conventional transistorized operational amplifier well known to those skilled in the electronics art, together with the real DC value $I_{dist}$ of the HV DC transmission which is detected in a current converter 28, which is a conventional DC current transformer as shown in FIG. 48.17 on page 461 of the above-mentioned book by Kupfmuller, located in the HV DC transmission line 1. From these two values $P_{soll}$ and $I_{dist}$, the device 27 determines the nominal DC value $U_{dsoll}$ which is applied to a DC voltage regulator 29. This regulator is a conventional type of controller such as illustrated, for example in page 604 of the book "Kleines Handbuch der Regelungstechnik" by Oppelt, 1st Ed. 1960, published by Verlag CHEMIE. Weinheim, West Germany. The real value of the DC voltage $U_{dist}$ at the tapping station is ascertained by means of a DC voltage transformer 30 connected between the ends 24, 25 of the tapping station and likewise supervises the regulator 29. Voltage transformer 30 is of a conventional DC type which is shown, for example, in FIG. 48.1 on page 48 of the book "Grundlagen der Elektrotechnik" by Moeller, 11th Ed. 1961 published by Teubner-Verlag, Stuttgart, West Germany. The control value available at the output of this regulator 29 is applied to a switch 31 together with the nominal value $U_{dsoll}$ of the DC voltage. Switch 31 is of the controlled connector type such as illustrated in FIG. 2 on page 43 of the book "Digitals Signalverarbeitung in der Regelungstechnik" by C. Kessler, 1st Ed. 1962 published by VDE-Verlag Berlin, West Germany. The switch 31 has four outputs each leading through a diode 32, 33, 34 and 35 to the four grid control units $St3$, $St4$, $St5$ and $St6$. The switch 31 decides in view of the nominal voltage $U_{dsoll}$ which converter bridge is to be affected by the control value supplied by the DC voltage regulator 29, in order to change the control angle. The remaining three converter bridges are simultaneously modulated with their minimum permissible control angle $\alpha=0$ or $\gamma_{min}$. This results in the minimum possible reactive power requirements for these converter bridges. An example may serve as explanation. Let it be assumed that the tapping power of the station has hitherto been zero and should now be raised to 0.8 of the maximum value. At zero power the bridges 3 and 4 are fully modulated in the inverter range and the bridges 5 and 6 in the rectifier range. In order to achieve the desired tapping power, the nominal voltage $U_{dsoll}$ and the regulating value at the input of the switch 31 are raised. The switch 31 applies this regulating value first only to the grid control unit $St5$ and this modulates the bridge 5 fully into the inverter range, i.e., to $\gamma_{min}$. This achieves a total voltage $U_{dist}$ of 0.5 of the total voltage. This modulation of the bridge 5 is maintained. Since the voltage is to be raised further, the tapped power not having yet reached its nominal value, the switch 31 applies the regulating value to the grid control unit St6 which now opens the valves of the converter bridge 6 in accordance with the regulating value, that is in this case up to a total voltage of 0.8. This means that the bridge 6 is modulated from maximum rectifying modulation through zero value to an inverter voltages of 0.05 of the total voltage or 0.2 of its maximum bridge voltage. Thus, to achieve the desired total voltage, the control of the individual bridges is effected successively and follows the same adjusting order.

Figure 3:
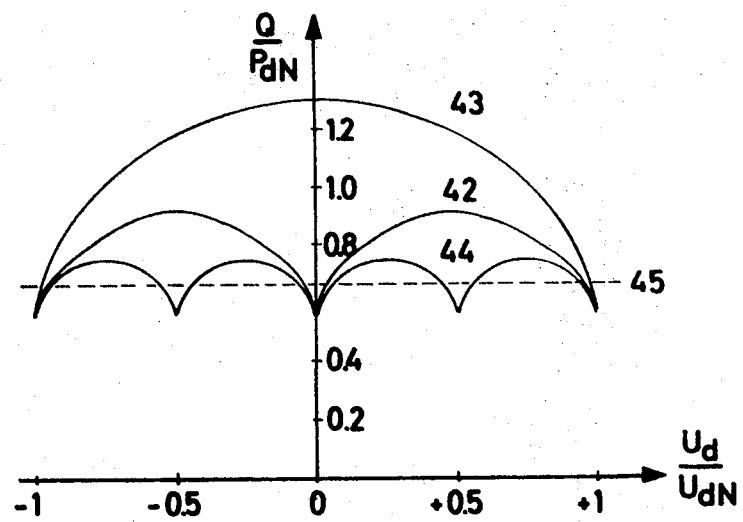
FIG. 3 is a diagram of the reactive power as a function of the modulation of the tapping section.

FIG. 3 shows a diagram of the reactive power requirements as a function of the voltage. The reactive power is shown as Q and is related to the DC output $P_{dN}$. Similarly, the voltage $U_d$, depending on the control angle $\alpha$ in the positive range and on the control angle $\gamma$ in the negative range, is related to the idling voltage $U_{do}$. Maximum rectifier voltage is achieved at the abscissa value 1 of the related voltage $U_d/U_{do}$ i.e. all four converter bridges function in the rectifying range and the power which may be transferred from the AC network to the HV DC transmission is at maximum. A constant nominal current will always be assumed in the installation. If the abscissa value is −1 then the maximum inverter voltage is available as a countervoltage in the tapping station, and correspondingly the power which can be taken from the HV DC transmission is at maximum. In the diagram of FIG. 3 the center curve 42 consisting of two circular segments represents the approximate curve of the reactive power requirements of a tapping station constructed from two converter bridges. Of these, one bridge is modulated in the inverter range of the diagram, i.e. from 0 to −1 on the abscissa, corresponding to the whole control range from maximum rectifying to maximum inverter voltage, the other from 0 to +1 in the rectifier range of the diagram, corresponding to its whole control range from maximum inverter to maximum rectifier voltage. The reactive power requirements are lowest with maximum and minimum voltage and with zero total voltage, amounting to about 0.6 of the effective nominal output $P_{dN}$. With about half of the nominal voltage, with one of the bridges modulated to zero value ($\alpha=90$) the requirements are largest and amount to about 0.9 $P_{dN}$.

The upper curve 43 in the shape of a circular arc represents, by way of comparison, the reactive power of a tapping station constructed from one or from two or four uniformly controlled converter bridges. At zero voltage, that is, in the absence of any power exchange, the reactive power requirement is at maximum and amounts to about 1.3 of the effective nominal power $P_{dN}$. Such an expenditure cannot be economically tolerated, especially since the reactive power requirements change between maximum and minimum voltage modulation from 0.6 to 1.3 $P_{dN}$. In addition to the static coverage of the basic requirement of 0.6 $P_{dN}$ by means of storage batteries, 0.7 $P_{dN}$ would still have to be covered dynamically or the AC network would have to be loaded to this amount. For this reason, a tapping station constructed from four converter bridges, is most advantageous. The lowest curve in FIG. 3 shows the reactive power input, as indicated by the reference numeral 44; this curve consists of four circular segments. Only one converter bridge is here modulated over its entire control angle range, i.e., from $\alpha=0$ to $\gamma_{min}$, and is constructed for one-quarter of the maximum voltage at the tapping station. If, for example, the maximum power is to be transferred from the HV DC transmission to the connected AC network, all bridges are modulated to maximum bridge inverter voltage. The total voltage then yields maximum countervoltage, i.e., −1 in FIG. 3, in which the working ranges of the converter bridges 3, 4, 5 and 6 correspond to the four voltage ranges from −1 to −0.5, −0.5 to 0.0, 0.0 to +0.5 and +0.5 to +1.0. When now the voltage is to be reduced to −0.5, the bridge 6, for example, is returned from maximum inverter voltage control to maximum rectifier control. The other bridges remain unchanged. Only when a further reduction is to be achieved, the bridge 5 is reduced in its inverter control. With this arrangement and control, the reactive power of the tapping station fluctuates only within the comparatively narrow range of about 0.6 to 0.7 $P_{dN}$ and is substantially lower as in the case of a tapping station with two or even one converter bridge or with several uniformly controlled bridges. Usually, a storage battery is sued on the AC side for compensating the reactive power. Preferably, this battery will be so large that the deviations of the reactive power are substantially equal during modulations of the bridges towards the top or bottom. In FIG. 3, the dotted line 45 meets this requirement at about 0.65. Then, the AC network has merely to collect the deviations.

FIG. 2 shows, in addition to the control circuit for the sequential control serving as main control, also a further control circuit. This circuit consists of a voltage regulator 36 which receives the nominal value $U_{\sim soll}$ of the AC network 13 and, via a voltage transformer 37, the real value $U_{\sim ist}$ of the AC network. The voltage controller 31 is, in essence, a set of four regulators, each equivalent to voltage regulator 29 whose inputs are connected in parallel for feeding each U with the actual value $U_{\sim ist}$ of the AC voltage. The voltage regulator 36 has four parallel outputs, of which always one leads over a diode 38, 39, 40, 41 to one of the four grid control units St3 to St6. This control circuit and the corresponding control method represent an advantageous embodiment of the invention, whereby the maintenance of the voltage in the supplied AC network can be substantially improved. With simultaneous engagement of the grid control of all converter bridges, the reactive power input of the converter bridges may be substantially varied without great effects on the DC voltage of the tapping station and therefore on the effective tapping performance. By acting on the reactive power balance of the AC network, however, the voltage stability may also be affected.

Thus, the adjustment of the reactive power is effected through the sequential control by changing the control angle of always only one converter bridge, as already described hereinbefore. However, the adjustment of the reactive power is effected by means of the voltage regulator 36, acting simultaneously on all converter bridges through the grid control units St3 to St6 and the diodes 38 to 41, whilst, for example, the main control acts merely through the diode 35 on the grid control unit St6 and the bridge 6 and is here dominant. The two oppositely connected diodes 41 and 35 have here the function of the release diodes, i.e., only the higher potential is effective at the input of the corresponding grid control unit. The reactive power regulator may also replace the voltage regulator 36 and may have any desired relation to the voltage and other values of the AC network.

A tapping station with four converter bridges, constructed according to the invention, with a common multiple winding transformer, offers special advantages where the tapping performance represents only a relatively small part of the HV DC transmission performance. The main insulation of the converter transformer must take up the whole DC voltage of the HV DC transmission system, but, by comparison, the voltage of the four secondary windings on the bridge side is only small. While the main insulation need be effected only once, the mutual insulation of the valve side windings of the same phase is comparatively weak. Preferably, also, a HV multiple lead-through is used for each phase of the secondary winding of the converter transformer, i.e., for each individual phase. This multiple lead-through carries, under small mutual insulation, but under high total insulation against the vessel of the converter transformer, the winding leads of one phase towards the outside to the associated converter bridges. In the embodiment of FIG. 2, with four converter bridges, only three high-voltage leads-through are therefore required, each containing four small intermediate voltage leads-through. Possibly, these multiple high-voltage leads-through may also be used as insulations in leads-through in buildings.

The advantages of the invention are that it provides a tapping station for a HV DC transmission, requiring only small expenditure, without affecting the branching of the current and without affecting the control system of the HV DC transmission. Power exchange is possible in both directions with a minimum or at constant reactive power. By means of the switches provided, it is also possible to maintain operation at different directions of current flow and under switching into both network terminals of the HV DC transmission system.

I claim:

1. An arrangement for tapping the direct-current link of a high-voltage direct-current transmission system comprising at least two series-connected auxiliary converters of the controllable electric valve type arranged between two tapping points on the direct-current link, the alternating current output terminals of said auxiliary converters being connected with power transformer means, a grid control unit individual to each auxiliary converter unit, each of said grid control units being controlled by the outputs of an alternating-current voltage controller and a direct-current voltage controller, the output of said alternating-current voltage controller being applied simultaneously to the input terminals of all of said grid control units and control switch means applying the output of said direct-current voltage controller successively to the input terminals of said grid control units.

2. An arrangement according to claim 1 wherein said power transformer means are formed by a unitary power transformer having one primary winding and a plurality of secondary windings, each said secondary winding being connected with one of the alternating current output terminals of said auxiliary converters whereby a main insulation for the full direct-current voltage is provided for the secondary windings and the mutual insulation between the secondary windings is provided for a relatively small direct-current voltage.

3. An arrangement according to claim 2 and which further includes a unitary high-voltage bushing insulator provided with a plurality of intermediate-voltage bushings corresponding respectively to said plurality of auxiliary converters and through which the alternating-current output terminals of said auxiliary converters lead respectively to said secondary windings of said unitary power transformer.

4. An arrangement according to claim 1 and wherein release diodes are provided for applying the output of said alternating-currebnt voltage controller and the output of said direct-current voltage controller to the input terminals of said grid control units.

5. An arrangement as defined in claim 1 wherein said direct-current voltage controller is of the dual input type, one of said inputs being connected to a direct-current voltage transformer arranged between said tapping points on said direct-current link, and the other of said inputs being constituted by the output of a dual-input comparison device which compares the frequency of the alternating current voltage with the direct current flowing in said link to produce a nominal direct-current voltage output, the output of said direct-current voltage controller being applied through the contacts of said control switch means successively to said grid control units, and said control switch means being actuated by the direct-current voltage output from said comparison device.

6. An arrangement as defined in claim 5 and which includes a frequency measuring device connected with the primary side of said power transformer means, the output of said frequency measuring device being connected to one of the inputs of said dual-input comparison device.

7. An arrangement for tapping the direct-current link of a high-voltage direct-current transmission system comprising at least two series-connected auxiliary converters of the controllable electric valve type arranged between two tapping points on the direct-current link, the alternating-current output terminals of said auxiliary converters being connected to power transformer means, a grid control unit individual to each auxiliary converter unit, a direct-current voltage controller, and control switch means applying the output of said direct-current voltage controller successively to the input terminals of said grid control units.

8. An arrangement according to claim 7 wherein said power transformer means are formed by a unitary power transformer having one primary winding and a plurality of secondary windings, each said secondary winding being connected with one of the alternating-current output terminals of said auxiliary converters whereby a main insulation for the full direct-current voltage is provided for the secondary windings and the mutual insulation between the secondary windings is provided for a relatively small direct-current voltage.

9. An arrangement according to claim 8 and which further includes a unitary high-voltage bushing insulator provided with a plurality of intermediate-voltage bushings corresponding respectively to said plurality of auxiliary converters and through which the alternating-current output terminals of said auxiliary converters lead respectively to said secondary windings of said unitary power transformer.

10. An arrangement as defined in claim 7 wherein said direct-current voltage controller is of the dual-input type, one of said inputs being connected to a direct-current voltage transformer arranged between said tapping points on said direct-current link, and the other of said inputs being constituted by the output of a dual-input comparison device which compares with frequency of the alternating-current voltage with the direct current flowing in said link to produce a nominal direct-current voltage output; the output of said direct-current voltage controller being applied through the contacts of said control switch means successively to said grid control units, and said control switch means being actuated by the direct-current voltage output from said comparison device.

11. An arrangement as defined in claim 10 and which includes a frequency measuring device connected with the primary side of said power transformer means, the output of said frequency measuring device being connected to one of the imputs of said dual-input comparison device.